United States Patent
Choi et al.

(10) Patent No.: US 11,019,664 B2
(45) Date of Patent: May 25, 2021

(54) UPLINK SIGNAL TRANSMISSION DEVICE AND UPLINK SIGNAL TRANSMISSION METHOD

(71) Applicant: SK TELECOM CO., LTD., Seoul (KR)

(72) Inventors: Chang Soon Choi, Seoul (KR); Hae Sung Park, Seoul (KR); Seung Young Ban, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 17 days.

(21) Appl. No.: 16/302,819

(22) PCT Filed: Dec. 28, 2016

(86) PCT No.: PCT/KR2016/015425
§ 371 (c)(1),
(2) Date: Nov. 19, 2018

(87) PCT Pub. No.: WO2017/222132
PCT Pub. Date: Dec. 28, 2017

(65) Prior Publication Data
US 2019/0306886 A1    Oct. 3, 2019

(30) Foreign Application Priority Data

Jun. 24, 2016  (KR) .................. 10-2016-0079312

(51) Int. Cl.
*H04W 56/00* (2009.01)
*H04W 74/08* (2009.01)
(Continued)

(52) U.S. Cl.
CPC ...... *H04W 74/0833* (2013.01); *H04B 7/0408* (2013.01); *H04B 7/0413* (2013.01);
(Continued)

(58) Field of Classification Search
None
See application file for complete search history.

(56) References Cited

U.S. PATENT DOCUMENTS 10,484,062 B2 * 11/2019 Xiong ................ H04W 72/046
2013/0028186 A1 * 1/2013 Kim .................... H04B 7/0617
370/328
(Continued)

FOREIGN PATENT DOCUMENTS

| KR | 10-2014-0056561 A | 5/2014 |
| KR | 10-1563469 B1 | 10/2015 |
| WO | 2015080646 A1 | 6/2015 |

OTHER PUBLICATIONS

International Search Report dated Mar. 20, 2017, issued in corresponding International Patent Application No. PCT/KR2016/015425.
Samsung, "Random Access Procedure in NR", 3GPP TSG-RAN WG2 Meeting #94, May 23-27, 2016, Nanjing, China.
Nokia et al, "Support for Beam Based Common Control Plane", 3GPP TSG-RAN WG1#85, May 23-27, 2016, Nanjing, China.
Extended European Search Report dated Oct. 1, 2019 in connection with the counterpart European Patent Application No. EP16906407.8.

*Primary Examiner* — Ajit Patel
(74) *Attorney, Agent, or Firm* — Hauptman Ham, LLP

(57) ABSTRACT

The present invention relates to an uplink signal transmission for an access between a base station and a terminal in an MIMO system, and provides an uplink signal transmission device and an uplink signal transmission method, which can improve, using beamforming, uplink signal transmission performance.

11 Claims, 5 Drawing Sheets

(51) Int. Cl.

| | |
|---|---|
| *H04B 7/0413* | (2017.01) |
| *H04B 7/06* | (2006.01) |
| *H04W 16/28* | (2009.01) |
| *H04W 72/04* | (2009.01) |
| *H04W 74/02* | (2009.01) |
| *H04B 7/08* | (2006.01) |
| *H04B 7/0408* | (2017.01) |
| *H04W 74/00* | (2009.01) |

(52) U.S. Cl.
CPC ........... *H04B 7/0617* (2013.01); *H04B 7/088* (2013.01); *H04W 16/28* (2013.01); *H04W 56/001* (2013.01); *H04W 72/046* (2013.01); *H04W 74/00* (2013.01); *H04W 74/02* (2013.01); *H04W 74/08* (2013.01); *H04W 74/0891* (2013.01)

(56) References Cited

U.S. PATENT DOCUMENTS

| | | |
|---|---|---|
| 2013/0301567 A1 | 11/2013 | Jeong et al. |
| 2014/0177607 A1 | 6/2014 | Li et al. |
| 2015/0009984 A1 | 1/2015 | Jung et al. |
| 2016/0099763 A1 | 4/2016 | Chen |
| 2016/0119958 A1 | 4/2016 | Tan et al. |
| 2017/0033851 A1* | 2/2017 | Zhong .................. H04B 7/0413 |
| 2018/0359044 A1* | 12/2018 | Pirskanen ............ H04J 11/0069 |
| 2018/0359790 A1* | 12/2018 | Ingale .................... H04W 8/24 |

\* cited by examiner contention based random access state

UPLINK SIGNAL TRANSMISSION DEVICE AND UPLINK SIGNAL TRANSMISSION METHOD

BACKGROUND OF THE INVENTION

Technical Field

The present disclosure relates to uplink signal transmission technology in a MIMO system.

More specifically, the present disclosure relates to technology for improving uplink signal transmission capability by proposing a new uplink signal transmission scheme using beamforming when uplink signal for access is transmitted between a base station and a user equipment.

Background Art

In the beamforming technology, it is generally understood that each of a transmitting device and a receiving device includes a plurality of antennas.

There are various technologies performing communication based on a beamforming technology where an improvement of transmission capacity is expected proportional to the number of transmitting/receiving antennas without using additional frequency or power. The representative technology thereof is a Multiple Input Multiple Output (MIMO) technology.

In a communication system (hereinafter, MIMO system) using a MIMO technology, a transmission capacity gain can be most largely obtained from a diversity gain and a multiplexing gain through beamforming.

For transmission/reception devices communicating with each other based on the beamforming technology, a gain through beamforming can be obtained when they transmit signals through antenna beams having beamforming directions that match each other among antenna beams of various directions that can be formed by the transmission device and the reception device.

In the existing beamforming technology, there has not been proposed a detailed scheme using beamforming in the transmission of an uplink signal (for example, a random access preamble) that a transmission device such as a User Equipment (UE) transmits to a reception device such as a Base Station (BS) for connection between the BS/UE.

Accordingly, in the MIMO system, the uplink signal of the UE may not successfully reach the BS because of mismatching of beamforming directions between the UE and the BS.

Therefore, there is need a detailed method for avoiding transmission failure of the uplink signal of the UE, thereby improving the uplink signal transmission performance.

The present disclosure proposes a new uplink signal transmission scheme using beamforming in the MIMO system.

SUMMARY OF THE INVENTION

An aspect of the present disclosure is to improve transmission performance of the uplink signal for connection between the BS/UE in the MIMO system.

Technical Solution

An apparatus for transmitting an uplink signal for random access based on beamforming according to an embodiment of the present disclosure includes: a beamforming synchronization unit configured to perform beamforming synchronization for a Base Station (BS) forming a plurality of antenna beams having different directions for each symbol within radio resource; a selection unit configured to select at least one transmission antenna beam during beamforming synchronization; an identification unit configured to identify a symbol location and a beam identifier for the at least one selected transmission antenna beam; and a signal transmission control unit configured to, based on at least one symbol location and at least one beam identifier, transmit an uplink signal for random access to the BS using the at least one symbol location and the at least one beam identifier matching to at least one symbol location for a plurality of symbols within specific radio resource.

Specifically, the specific radio resource may correspond to an uplink random access channel subframe being periodically allocated, and the BS may form a reception antenna beam for each symbol within the uplink random access channel subframe in the same manner as a transmission antenna beam pattern formed for each symbol when the beamforming synchronization is performed.

Specifically, the selection unit may be configured to select a specific transmission antenna beam which is beamforming-synchronized with the BS through the beamforming synchronization Specifically, the selection unit may be configured to select one transmission antenna beam for each symbol within the radio resource during the beamforming synchronization for the BS.

Specifically, the selection unit may be configured to select one transmission antenna beam having the best received signal quality from a plurality of transmission antenna beams formed in each symbol within the radio resources during the beamforming synchronization for the BS.

Specifically, in a non-contention-based random access state, the signal transmission control unit may be configured to transmit the uplink signal for random access to the BS using the beam identifier and the symbol location of a plurality of symbols within the specific radio resource based on the symbol location and the beam identifier of the specific transmission antenna beam.

Specifically, in a contention-based random access state, the signal transmission control unit may be configured to transmit the uplink signal for random access to the BS using each symbol location within the specific radio resource and each beam identifier matching to the each symbol location, based on the symbol location and the beam identifier of each transmission antenna beam selected for each symbol within the radio resource.

A method of transmitting an uplink signal for random access based on beamforming according to an embodiment of the present disclosure includes: selecting at least one transmission antenna beam during a beamforming synchronization with a Base Station (BS) forming a plurality of transmission antenna beams having different directions for each symbol within radio resource; identifying a symbol location and a beam identifier for the at least one selected transmission antenna beam; and transmitting, based on at least one symbol location and at least one beam identifier, an uplink signal for random access to the BS using the at least one symbol location and the at least one beam identifier matching to the at least one symbol location for a plurality of within specific radio resource.

Specifically, the specific radio resource may correspond to an uplink random access channel subframe being periodically allocated, and the BS forms a reception antenna beam for each symbol within the uplink random access channel subframe in the same manner as a transmission antenna beam pattern formed for each symbol when the beamforming synchronization is performed.

Specifically, the selecting may comprise selecting a specific transmission antenna beam which is beamforming-synchronized with the BS through the beamforming synchronization.

Specifically, the selecting may comprise selecting one transmission antenna beam for each symbol within the radio resource during the beamforming synchronization for the BS.

Specifically, the transmitting may comprise transmitting the uplink signal for random access to the BS using the beam identifier and the symbol location of a plurality of symbols within the specific radio resource based on the symbol location and the beam identifier of the specific transmission antenna beam in a non-contention-based random access state.

Specifically, the transmitting may comprise transmitting the uplink signal for random access to the BS using each symbol location within the specific radio resource and each beam identifier matching to the each symbol location based on the symbol location and the beam identifier of each transmission antenna beam selected for each symbol within the radio resource in a contention-based random access state.

The present disclosure can derive an effect of improving transmission performance of uplink signal for the connection between the BS/UE in the MIMO system.

DETAILED DESCRIPTION OF THE EXEMPLARY EMBODIMENTS

Figure 1:
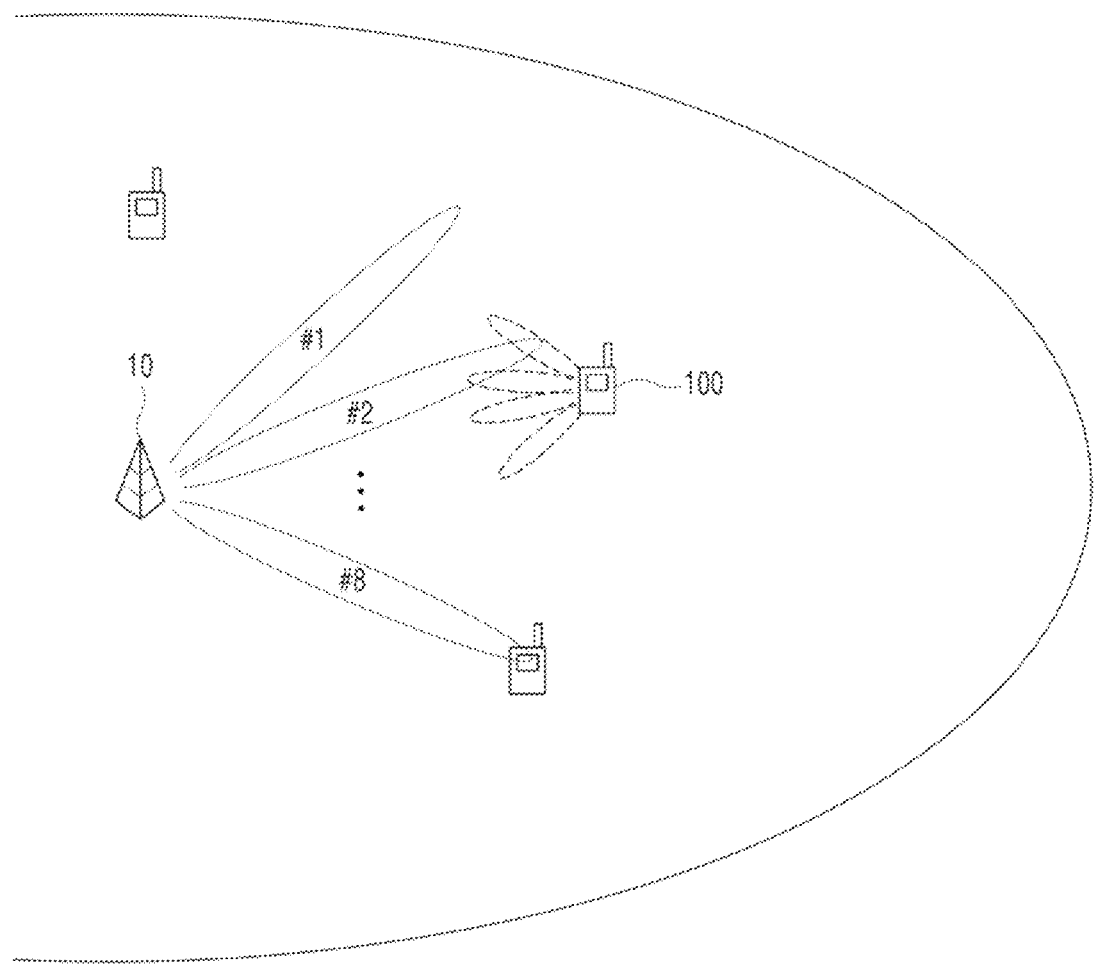
FIG. 1 illustrates a MIMO system to which the present disclosure is applied.

It should be noted that the technical terms as used herein are merely used for describing particular embodiments, and are not intended to limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as a first, a second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the technical idea should not be construed as being limited by the accompanying drawings.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

Hereinafter, embodiments of the present disclosure will be described with reference to the accompanying drawings.

A Multiple Input Multiple Output (MIMO) technology is a technology where a transmission capacity gain is expected proportional to the number of transmitting antennas and the number of receiving antennas without using additional frequency or power. In the above MIMO technology, a transmission capacity gain can be most largely obtained from a diversity gain and a multiplexing gain through beamforming.

A beamforming technology used by a MIMO system is divided into digital beamforming, analog beamforming, and hybrid beamforming.

A plurality of beams generated by a digital beamforming technique may be used for improving the diversity of a receiving terminal to increase the quality (Signal to Interference Noise Ratio, SINR) of a signal and may also be used for multiplexing allowing that a plurality of receiving terminals are divided by means of different beams to receive different signals.

However, because the number of beams generated by a digital beamforming technique is determined by the number of RF chains, the installation cost may be increased.

Meanwhile, a plurality of beams generated by an analog beamforming technique is restrictively used only for improving the diversity of a receiving terminal to improve a signal quality (SINR).

Finally, because of the disadvantages of a digital beamforming technique requiring high installation cost and an analog beamforming technique having limited performance gain, a MIMO system mainly uses a hybrid beamforming technique in which the above beamforming techniques are combined.

Accordingly, hereinafter, a hybrid beamforming technique will be referred to in the present disclosure.

As illustrated in FIG. 1, with respect to transmission/reception devices communicating with each other in the MIMO system using beamforming technology, for example, hybrid beamforming technology to which the present disclosure is applied, a gain through beamforming can be obtained when they transmit signals through antenna beams having beamforming directions that match each other among antenna beams of various directions that can be formed by the transmission device and the reception device.

In the existing beamforming technology, there has not been proposed a detailed scheme using beamforming in the transmission of an uplink signal (for example, a random access preamble) that the UE transmits to the BS for connection between the BS/UE.

Accordingly, in the MIMO system, the uplink signal of the UE may not successfully reach the BS because of mismatching of beamforming directions between the UE and the BS.

The present disclosure proposes a new uplink signal transmission scheme using beamforming in the MIMO system.

Specifically, the new uplink signal transmission scheme using beamforming is implemented through an uplink signal transmission device proposed by the present disclosure.

Referring to FIG. 1, a BS 10 includes a plurality of antennas and a UE 100 also includes a plurality of antennas.

Hereinafter, for convenience of description, it is assumed that the BS 10 includes 8 antennas and that the UE 100 includes four antennas.

Here, the uplink signal transmission device proposed by the present disclosure may be the UE 100 or an internal device operating inside the UE 100.

Hereinafter, it is assumed that the uplink signal transmission device is the UE 100.

In the MIMO system to which the present disclosure is applied, the BS 10 forms a plurality of transmission antenna beams having different directions for each symbol within radio resources.

The UE 100 performs beamforming synchronization for the BS 10 forming a plurality of transmission antenna beams having different directions for each symbol within radio resources.

The UE 100 selects at least one transmission antenna beam during a process of beamforming synchronization for the BS 10.

Further, the UE 100 identifies a symbol location and a beam identifier for at least one selected transmission antenna beam.

Thereafter, based on at least one identified symbol location and at least one previously identified beam identifier, the UE 100 transmits an uplink signal (ex. a random access preamble) to the BS 10 at the at least one symbol location of symbols within specific radio resources using a beam identifier that matches the at least one symbol location.

Here, the specific radio resources through which the UE 100 transmits the uplink signal (ex. the random access preamble) may be a periodically allocated uplink random access channel subframe.

When identifying the symbol location and the beam identifier for at least one transmission antenna beam selected during the beamforming synchronization process with the BS 10, the UE 100 transmits the uplink signal to the BS 10 at the identified symbol location of the symbols within the uplink random access channel subframe using the beam identifier that matches the identified symbol location.

For each symbol within the uplink random access channel subframe, the BS 10 may form a reception antenna beam in the same pattern as a transmission antenna beam pattern formed for each symbol when performing beamforming synchronization with the UE 100.

As a result, according to the present disclosure, the BS 10 forms a reception antenna beam for each symbol within the uplink random access channel subframe in the same pattern as the transmission antenna beam pattern formed for each symbol when beamforming synchronization is performed.

Further, in the present disclosure, the UE 100 transmits an uplink signal to the BS 10 through beamforming with respect to a transmission antenna beam (=reception antenna beam) selected (determined) when beamforming synchronization is performed with the BS 10.

At this time, in transmission of the uplink signal to the BS 10, the UE 100 transmits uplink signal to the BS 10 through beamforming for the BS 10, so that there is no failure of the uplink signal to arrive at the BS 10 due to mismatch of the beamforming direction between the UE 100 and the BS 10, thereby improving the uplink signal transmission performance.

Hereinafter, a scheme of transmitting the uplink signal according to the present disclosure will be described in more detail, and a process of deriving the effect of the present disclosure will be described.

The uplink signal transmission device according to an embodiment of the present disclosure will be described with reference to FIG. 2.

For convenience of description, it is assumed that the uplink signal transmission device according to the present disclosure is the UE 100.

Figure 2:
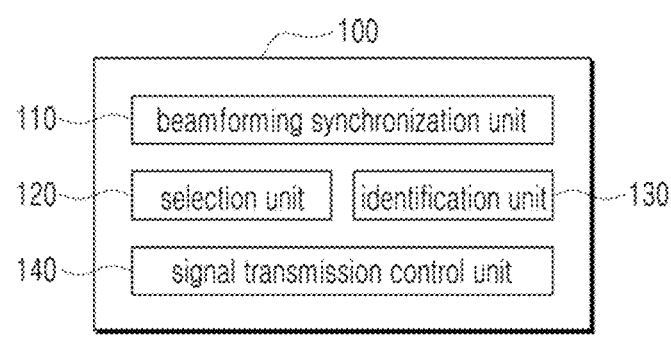
FIG. 2 illustrates the configuration of an uplink signal transmission device according to an embodiment of the present disclosure.

As illustrated in FIG. 2, the uplink signal transmission device 100 according to the present disclosure may include a beamforming synchronization unit 110 configured to perform beamforming synchronization for the BS 10 forming a plurality of transmission antenna beams having different directions for each symbol within radio resources, a selection unit 120 configured to select at least one transmission antenna beam during the beamforming synchronization, an identification unit 130 configured to identify a symbol location and a beam identifier for the at least one selected transmission antenna beam, and a signal transmission control unit 140 configured to, based on at least one identified symbol location and at least one identified beam identifier, transmit an uplink signal to the BS 10 at the at least one symbol location of symbols within specific radio resources using a beam identifier that matches the at least one symbol location.

The beamforming synchronization unit 110 performs beamforming synchronization for the BS 10.

In the MIMO system to which the present disclosure is applied, it is very important to synchronize between the BS and the UE by selecting optimal beams having the best channel environment from antenna beams in several directions that can be formed by the BS and antenna beams in several directions that can be formed by the UE.

The uplink signal transmission device 100 according to the present disclosure, that is, the UE 100, performs beamforming synchronization with the BS 10.

The beamforming synchronization between the BS 10 and the UE 100 is performed based on a synchronization signal periodically transmitted in radio resources predetermined for synchronization.

Of course, timing synchronization may be performed between the BS and the UE in addition to the beamforming synchronization performed by selecting the optimal beams having the best channel environment. However, in the present disclosure, a description of timing synchronization between the BS and the UE is omitted.

Figure 3:
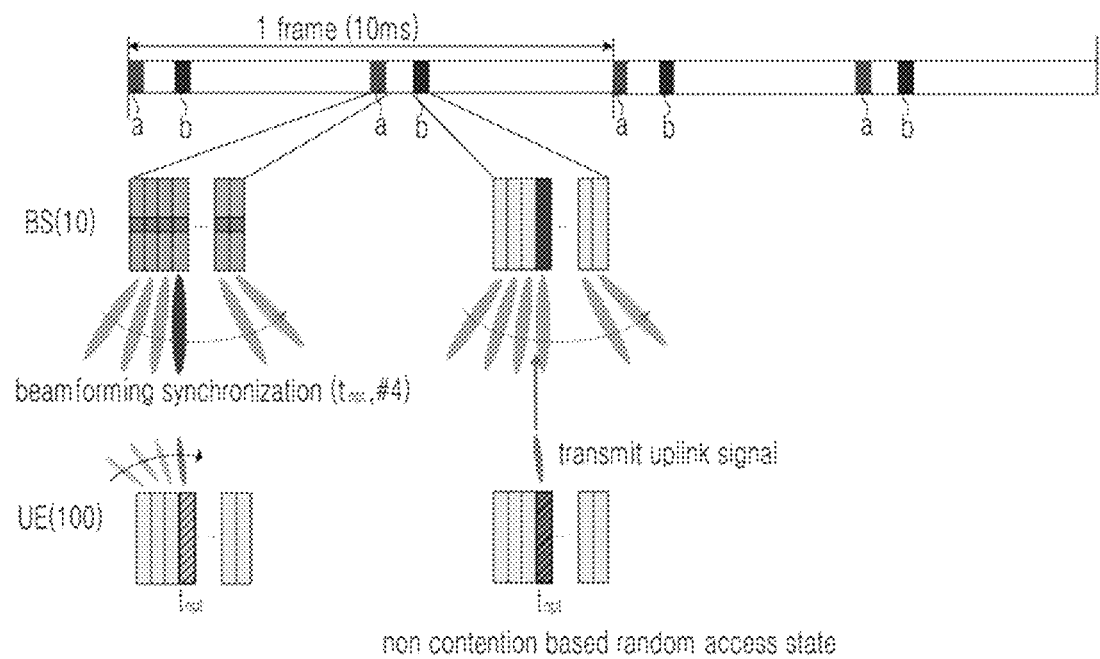
FIG. 3 and FIG. 4 illustrate embodiments of an uplink signal transmission structure through an uplink random access channel in the present disclosure.
Figure 4:
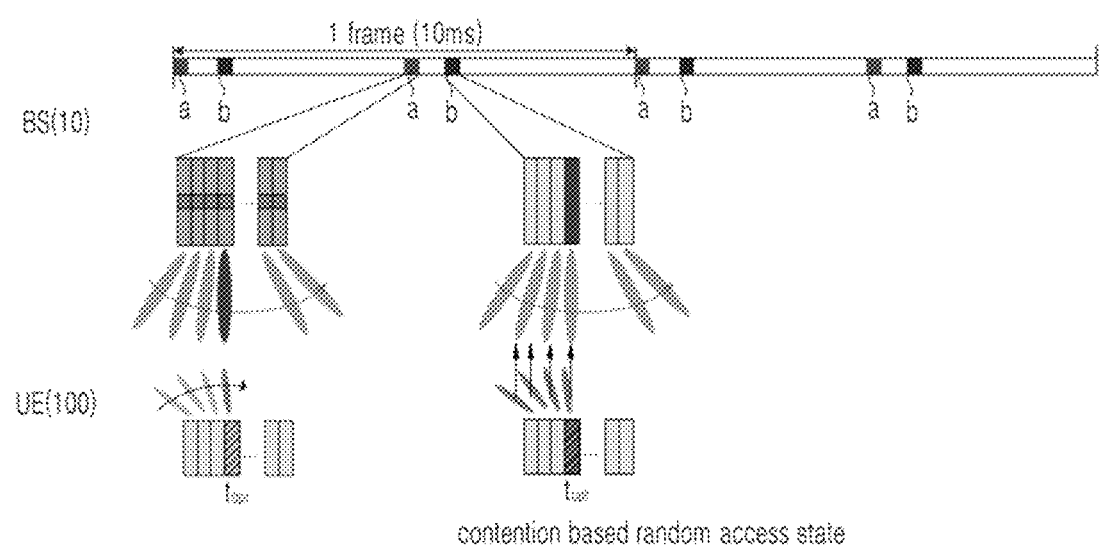

A process of performing the beamforming synchronization will be briefly described below. As illustrated in FIGS. 3 and 4, a downlink channel for synchronization are allocated to subframe (a) at predetermined locations in every frame (for example, subframes 0 to 49, 10 ms) of radio resources. Synchronization signals for synchronization between devices may be transmitted through the downlink synchronization channels periodically, that is, every 5 ms.

Hereinafter, for convenience of description, radio resources for synchronization between devices, that is, the subframe (a), is referred to as synchronization subframe.

Here, the synchronization subframe (a) consists of a plurality of symbols, for example, 14 OFDM symbols.

The BS 10 forms a plurality of transmission antenna beams having different directions for each symbol within the synchronization subframe (a) for synchronization between devices.

When the BS 10 includes 8 antennas and the synchronization subframe (a) consists of 14 OFDM symbols, as described in the above example, the BS 10 forms 8 transmission antenna beams having different directions in one symbol within the synchronization subframe (a), wherein the 8 transmission antenna beams may be formed for each of 14 OFDM symbols within the synchronization subframe (a).

Accordingly, the BS 10 may form a total of 112 (8*14) transmission antenna beams in the synchronization subframe (a).

The BS 10 performs beamforming synchronization with the UE 100 by transmitting synchronization signals, that is, Beam Reference Signals (BRSs) for beamforming synchronization, through the 112 transmission antenna beams formed in the synchronization subframe (a).

The uplink signal transmission device 100 according to the present disclosure, that is, the UE 100, forms reception antenna beams in different directions for each symbol within the synchronization subframe (a) through each of a plurality of antennas included in the UE 100.

When the UE 100 includes four antennas as described above, the UE 100 may form four reception antenna beams having different directions in one symbol within the synchronization subframe (a), wherein the four transmission antenna beams are formed for each of 14 OFDM symbols within the synchronization subframe (a).

The UE 100, that is, the beamforming synchronization unit 110, may perform beamforming synchronization with the BS 100 by receiving synchronization signals, that is, BRSs for beamforming synchronization, through a plurality of reception antenna beams formed in the synchronization subframe (a) as described above.

In this regard, in the present disclosure, there is no limit on a detailed procedure of synchronizing between the BS 10 and the UE 100 based on the BRSs that the BS 10 transmits and the UE 100 receives by selecting the optimal beams (the optimal transmission antenna beam of the BS 10/the optimal reception antenna beam of the UE 100) having the best channel environment (received signal quality), and the beamforming synchronization may be performed through various procedures.

The selection unit 120 selects at least one transmission antenna beam during the beamforming synchronization process performed by the beamforming synchronization unit 110.

According to a first embodiment, the selection unit 120 may select a specific transmission antenna beam, which is beamforming-synchronized with the BS 10 through the beamforming synchronization, that is, an optimal transmission antenna beam of the BS 10.

According to a second embodiment, the selection unit 120 may select one transmission antenna beam for each symbol within radio resources, that is, the synchronization subframe (a), during beamforming synchronization for the BS 10.

More specifically, the selection unit 120 may select one transmission antenna beam with respect to each symbol within the synchronization subframe (a) during beamforming synchronization for the BS 10. The selected transmission antenna beams have the best received signal quality from a plurality of transmission antenna beams formed in the each symbol.

That is, the selection unit 120 selects 14 transmission antenna beams of the BS 10 having the best received signal quality (channel environment) for each of 14 OFDM symbols within the synchronization subframe (a) during beamforming synchronization for the BS 10.

Among 14 transmission antenna beams of the BS 10 that the selection unit 120 selects one by one for each of the 14 OFDM symbols within the synchronization subframe (a), there may be an optimal transmission antenna beam of the BS 10 that is beamforming-synchronized with the BS 10.

The identification unit 130 identifies a symbol location and a beam identifier for at least one transmission antenna beam selected by the selection unit 120.

In the case of the first embodiment, the identification unit 130 identifies a symbol location within the synchronization subframe (a) where the optimal transmission antenna beam of the BS 10 is transmitted and a beam identifier of the optimal transmission antenna beam of the BS 10.

Referring to FIG. 3, a symbol location ($t_{opt}$) where the optimal transmission antenna beam of the BS 10 is transmitted within the synchronization subframe (a) and a beam identifier (#4) of the optimal transmission antenna beam of the BS 10 may be identified.

Meanwhile, in the case of the second embodiment, the identification unit 130 identifies a symbol location within the synchronization subframe (a) and a beam identifier for each of 14 transmission antenna beams of the BS 10 selected in each symbol.

As illustrated in FIG. 4, among symbol locations and beam identifiers identified for 14 transmission antenna beams of the BS 10, there may be the symbol location ($t_{opt}$) and the beam identifier (#4) for the optimal transmission antenna beam of the BS 10.

Based on at least one symbol location and at least one beam identifier identified by the identification unit 130, the signal transmission control unit 140 transmits an uplink signal, for example, a random access preamble, to the BS 10 at the at least one symbol location of symbols within specific radio resources using the at least one beam identifier that matches the at least one symbol location.

Here, the specific radio resources for transmitting the uplink signal may be a periodically allocated uplink random access channel subframe.

As illustrated in FIGS. 3 and 4, by allocating subframes (b) positioned at predetermined locations in every frame (for example, subframes 0 to 49, 10 ms) of radio resources as uplink random access channels (Physical Random Access Channels: PRACHs) for transmission of uplink signals, the UE 100 requiring connection with the BS may transmit uplink signals through the PRACHs.

Hereinafter, the subframe (b) is referred to as a PRACH.

The PRACH (b) consists of a plurality of symbols, for example, 14 OFDM symbols.

The BS 10 forms a plurality of transmission antenna beams having different directions for each symbol within specific radio resources, that is, the PRACH (b) for uplink signal transmission.

Here, it is important for the BS 10 to form the reception antenna beam in the same pattern as the transmission antenna beam pattern formed for each symbol when beamforming synchronization is performed, with respect to each symbol within the uplink random access channel subframe, that is, the PRACH (b).

When the BS 10 includes 8 antennas and the PRACH (b) consists of 14 OFDM symbols as described above, the BS 10 forms 8 reception antenna beams having different directions in one symbol within the PRACH (b) in the same pattern as the transmission antenna beam pattern that is formed in each symbol within the synchronization subframe (a), wherein the 8 reception antenna beams may be formed for each of 14 OFDM symbols within the PRACH (b).

Accordingly, the BS 10 may form a total of 112 (8*14) reception antenna beams in the PRACH (b) in the same pattern as that of the synchronization subframe (a).

The signal transmission control unit 140 within the uplink signal transmission device 100, that is, the UE 100, identifies whether the UE 100 requires connection to the BS 10, that is, random access.

Random access is required when the UE 100 initially accesses a network (RRC connection establishment), when UE 100 again accesses the network (RRC connection reestablishment), when handover is initiated, or when data transmission is restarted (restart of up/downlink data transmission).

When it is identified that random access is required, based on at least one symbol location and at least one beam identifier identified by the identification unit 130, the signal transmission control unit 140 transmits an uplink signal to the BS 10 at the at least one symbol location of the symbols within specific radio resources, that is, the PRACH (b) using the at least one beam identifier that matches the at least one symbol location.

More specifically, when the UE 100 is in the non-contention-based random access state, the signal transmission control unit 140 transmits the uplink signal to the BS 10 based on the symbol location ($t_{opt}$) and the beam identifier (#4) of the specific transmission antenna beam, that is, the optimal transmission antenna beam of the BS 10 described in the first embodiment. The signal transmission control unit 140 transmits the uplink signal at the symbol location ($t_{opt}$) of the symbols within the PRACH (b) using the beam identifier (#4)

According to the non-contention-based random access, the network allocates preamble sequences, which can be used only by the UE 100, to the UE 100 before the UE 100 transmits the uplink signal to perform the random access operation.

Accordingly, when the UE 100 is in the non-contention-based random access state, there is no collision in transmission of the uplink signal by the UE 100.

Here, the non-contention-based random access state corresponds to the case of handover or the case in which downlink data transmission is restarted (restart of downlink data transmission) of the cases in which random access is required.

Accordingly, the uplink signal transmission scheme according to the first embodiment is suitable for the non-contention-based random access state of the UE 100, since the uplink signal is transmitted once in the PRACH (b)

More specifically, when the UE 100 is in non-contention-based random access state, the signal transmission control unit 140 transmits the uplink signal to the BS 10 based on the symbol location ($t_{opt}$) and the beam identifier (#4) of the optimal transmission antenna beam of the BS 10 identified in the first embodiment. The signal transmission control unit 140 transmits the uplink signal at the symbol location ($t_{opt}$) of the symbols within the PRACH (b) using the beam identifier (#4).

That is, the signal transmission control unit 140 performs the random access operation through the uplink signal transmission scheme according to the present disclosure in which the beamformed uplink signal is transmitted once in the PRACH (b).

As illustrated in FIG. 3, the BS 10 forms the reception antenna beam for each symbol within the PRACH (b) in the same pattern as the transmission antenna beam pattern formed for each symbol within the synchronization subframe (a), and the UE 100 transmits the uplink signal beamformed for the optimal reception antenna beam (transmission antenna beam) of the BS 10 at the time point ($t_{opt}$) within the PRACH (b) at which the optimal reception antenna beam (transmission antenna beam) of the BS 10 is formed.

Meanwhile, when the UE 100 is in the contention-based random access state, the signal transmission control unit 140 transmits the uplink signal to the BS 10 based on the symbol location and the beam identifier for each transmission antenna beam selected for each symbol within the synchronization subframe (a) according to the second embodiment. The signal transmission control unit 140 transmits the uplink signal to the BS 10 using the beam identifier that matches the symbol location for each symbol within the PRACH (b).

In the case of the contention-based random access, a plurality of UEs including the UE 100 within the cell of the BS 10 shares the preamble sequence. Accordingly, when the UE 100 is in the contention-based random access state, the uplink signal transmitted by the UE 100 may collide with an uplink signal of another UE sharing the same preamble sequence with the UE 100.

Here, the contention-based random access state correspond to a case in which the UE 100 initially accesses a network (RRC connection establishment), a case in which the UE 100 again accesses the network (RRC connection reestablishment), or a case in which uplink data transmission is restarted (restart of uplink data transmission) among cases in which random access is required.

The uplink signal transmission scheme according to the second embodiment, in which the beamformed uplink signal is transmitted in every symbol within the PRACH (b), is suitable for the contention-based random access state of the UE 100.

More specifically, when the UE 100 is in the contentious random access state, the signal transmission control unit 140 transmits the uplink signal to the BS 10 based on the symbol location and the beam identifier for each transmission antenna beam of the BS 10 selected/identified for each symbol within the synchronization subframe (a) according to the second embodiment. The signal transmission control unit 140 transmits the uplink signal to the BS 10 using the beam identifier, which matches the symbol location, for each symbol within the PRACH (b).

That is, in the contention state, the signal transmission control unit 140 performs the random access operation through the uplink signal transmission scheme according to the present disclosure, in which the beamformed uplink signal is transmitted in every symbol within the PRACH (b).

As illustrated in FIG. 4, the BS 10 forms the reception antenna beam for each symbol within the PRACH (b) in the same pattern as the transmission antenna beam pattern formed for each symbol within the synchronization subframe (a), and that the UE 100 transmits the uplink signal beamformed for the good reception antenna beam (transmission antenna beam) of the BS 10 in every symbol within the PRACH (b).

In the contention-based random access state, the UE 100 transmits the uplink signal beamformed for the good reception antenna beam (transmission antenna beam) of the BS 10 several times in every symbol within the PRACH (b). Accordingly, even if the uplink signal of UE 100 collides with that of another UE for one symbol, uplink signal transmission performance can be increased since an uplink signal is transmitted through another symbol.

As described above, the uplink signal transmission device, that is, the UE 100 proposed by the present disclosure transmits the beamformed uplink signal in the PRACH (b) to be suitable for both the non-contention-based random access state and the contention-based random access state, so that there is no failure of the uplink signal to arrive at the BS 10 due to mismatch of the beamforming direction between the UE 100 and the BS 10, thereby improving the uplink signal transmission performance.

Figure 5:
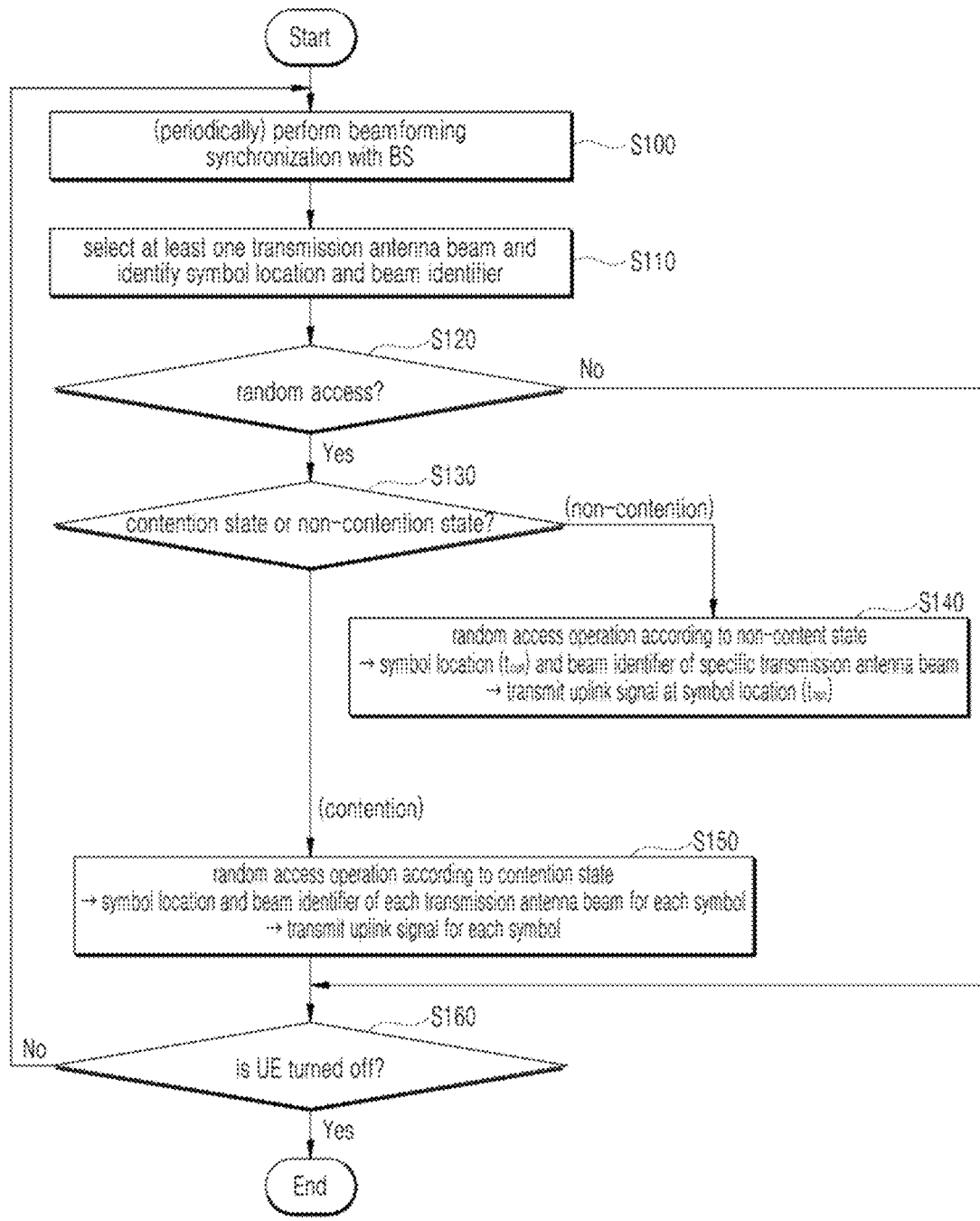
FIG. 5 is a flowchart illustrating an uplink signal transmission method according to an embodiment of the present disclosure.

Hereinafter, an uplink signal transmission method according to an embodiment of the present disclosure will be described with reference to FIG. 5.

For convenience of description, the UE 100 will be described as the uplink signal transmission device for consistency with the preceding description.

The UE 100 as the uplink signal transmission device periodically performs beamforming synchronization with the BS 10 in S100.

A process of performing the beamforming synchronization will be briefly described. As illustrated in FIGS. 3 and 4, the BS 10 forms a plurality of transmission antenna beams having different directions for each symbol within radio resources, that is, the synchronization subframe (a) for synchronization between devices.

When the BS 10 includes 8 antennas and the synchronization subframe (a) consists of 14 OFDM symbols as described above, the BS 10 forms 8 transmission antenna beams having different directions in one symbol within the synchronization subframe (a), wherein the 8 transmission antenna beams may be formed for each of 14 OFDM symbols within the synchronization subframe (a).

Accordingly, the BS 10 may form a total of 112 (**8\*14**) transmission antenna beams in the synchronization subframe (a).

The BS 10 performs beamforming synchronization with the UE 100 by transmitting synchronization signals, that is, Beam Reference Signals (BRSs) for beamforming synchronization, through the 112 transmission antenna beams formed in the synchronization subframe (a).

The uplink signal transmission device 100, that is, the UE 100, according to the present disclosure forms reception antenna beams in different directions for each symbol within the synchronization subframe (a) through each of a plurality of antennas included in the terminal 100.

When the UE 100 includes four antennas as described above, the UE 100 may form 4 reception antenna beams having different directions in one symbol within the synchronization subframe (a), wherein the 4 transmission antenna beams may be formed for each of 14 OFDM symbols within the synchronization subframe (a).

The UE 100 may perform beamforming synchronization with the BS 10 by receiving synchronization signals, that is, BRSs for beamforming synchronization, through a plurality of reception antenna beams formed in the synchronization subframe (a) as described above.

In this regard, in the present disclosure, there is no limit on a detailed procedure of synchronizing between the BS 10 and the UE 100 based on the BRSs that the BS 10 transmits and the UE 100 receives by selecting the optimal beams (the optimal transmission antenna beam of the BS 10/the optimal reception antenna beam of the UE 100) having the best channel environment (received signal quality), and the beamforming synchronization may be performed through various procedures.

In the uplink signal transmission method of the UE 100 according to the present disclosure, at least one transmission antenna beam is selected during a beamforming synchronization process with the BS 10 in S110.

With respect to the first embodiment, in the uplink signal transmission method of the UE 100 according to the present disclosure, a specific transmission antenna beam beamforming-synchronized with the BS 10 through the beamforming synchronization, that is, an optimal transmission antenna beam of the BS 10, may be selected.

With respect to the second embodiment, in the uplink signal transmission method of the UE 100 according to the present disclosure, transmission antenna beams of the BS 10 having the best received signal quality (channel environment) may be selected for each symbol within the synchronization subframe (a) during beamforming synchronization for the BS 10.

Further, in the uplink signal transmission method of the UE 100 according to the present disclosure, a symbol location and a beam identifier are identified for at least one selected transmission antenna beam.

In the case of the first embodiment, the uplink signal transmission method of the UE 100 according to the present disclosure may identify a symbol location ($t_{opt}$) within the synchronization subframe (a) where the optimal transmission antenna beam of the BS 10 is transmitted and a beam identifier (#4) of the optimal transmission antenna beam of the BS 10.

Meanwhile, in the case of the second embodiment, the uplink signal transmission method of the UE 100 according to the present disclosure may identify a symbol location within the synchronization subframe (a) and a beam identifier for each of 14 transmission antenna beams of the BS 10 selected in each symbol.

Thereafter, in the uplink signal transmission method of the UE 100 according to the present disclosure, the UE 100 identifies whether connection with the BS 10, that is, random access, is required in S120.

In the uplink signal transmission method of the UE 100 according to the present disclosure, when it is identified that the UE 100 requires random access (Yes in S120), it is determined whether the UE 100 is in the non-contention-based random access state or the contention-based random access state in S130.

In the uplink signal transmission method of the UE 100 according to the present disclosure, when the UE 100 is in the non-contention-based random access state (Non-contention in S130), the UE 100 transmits the uplink signal to the BS 10 based on the symbol location ($t_{opt}$) and the beam identifier (#4) of the optimal transmission antenna beam of the BS described in the first embodiment. The UE 100 transmits the uplink signal to the BS 10 at the symbol location ($t_{opt}$) of symbols within the PRACH (b) using the beam identifier (#4).

That is, in the uplink signal transmission method of the UE 100 according to the present disclosure, the random access operation is performed through the uplink signal transmission scheme according to the present disclosure, in which the beamformed uplink signal is transmitted once in the PRACH (b) in the non-contention state.

Here, it is important for the BS 10 to form the reception antenna beam in the same pattern as the transmission antenna beam pattern formed for each symbol when beamforming synchronization is performed, with respect to each symbol within the uplink random access channel subframe, that is, the PRACH (b).

When the BS 10 includes 8 antennas and the PRACH (b) consists of 14 OFDM symbols as described above, the BS 10 forms 8 reception antenna beams having different directions in one symbol within the PRACH (b) in the same pattern as the transmission antenna beam pattern formed in each symbol within the synchronization subframe (a), wherein the 8 reception antenna beams may be formed for each of 14 OFDM symbols within the PRACH (b).

Accordingly, the BS 10 may form a total of 112 (**8\*14**) reception antenna beams in the PRACH (b) in the same pattern as the transmission antenna beam of the synchronization subframe (a).

As illustrated in FIG. 3, the BS 10 forms the reception antenna beam for each symbol within the PRACH (b) in the same pattern as the transmission antenna beam pattern formed for each symbol within the synchronization subframe (a), and the UE 100 transmits the uplink signal beamformed for the optimal reception antenna beam (transmission antenna beam) of the BS 10 at the time point ($t_{opt}$) within the PRACH (b) when the optimal reception antenna beam (transmission antenna beam) of the BS 10 is formed.

When the UE 100 is in the contention-based random access state (Contention in S130), in the uplink signal transmission method of the UE 100 according to the present disclosure, the uplink signal is transmitted to the BS 10 based on the symbol location and the beam identifier for each transmission antenna beam of the BS 10 selected/identified for each symbol within the synchronization subframe (a) according to the second embodiment. The uplink signal is transmitted to the BS 10 using the beam identifier that matches the symbol location for each symbol within the PRACH (b).

That is, in the uplink signal transmission method of the UE 100 according to the present disclosure, the random access operation is performed through the uplink signal transmission scheme according to the present disclosure, in which the beamformed uplink signal is transmitted for each symbol in the PRACH (b) in the contention state.

As illustrated in FIG. 4, the BS 10 forms the reception antenna beam for each symbol within the PRACH (b) in the same pattern as the transmission antenna beam pattern formed for each symbol within the synchronization subframe (a), and the UE 100 transmits the uplink signal beamformed for the good reception antenna beam (transmission antenna beam) of the BS 10 in every symbol within the PRACH (b).

In the contention-based random access state, the UE 100 transmits the uplink signal beamformed for the best reception antenna beam (transmission antenna beam) of the BS 10 several times in every symbol within the PRACH (b). Accordingly, even if the uplink signal of UE 100 collides with that of another UE for one symbol, uplink signal transmission performance can be increased since an uplink signal is transmitted through another symbol.

In the uplink signal transmission method of the UE 100 according to the present disclosure, the operations in respective steps are repeatedly performed unless the UE is turned off (No in S160).

As a result, the present disclosure can improve uplink signal transmission performance by proposing a new uplink signal transmission scheme using beamforming in uplink signal transmission for the connection between the BS/UE in the MIMO system.

The implementations of the functional operations and subject matter described in the present disclosure may be realized by a digital electronic circuit, by the structure described in the present disclosure and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In addition, in the specification, the operations are illustrated in a specific sequence in the drawings, but it should not be understood that the operations are performed in the shown specific sequence or that all shown operations are performed in order to obtain a preferable result. In a specific case, a multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. An apparatus for transmitting, to a Base Station (BS) comprising a first plurality of antennas, an uplink signal for random access based on beamforming, the apparatus comprising a second plurality of antennas and a processor, wherein the processor is configured to:
by using the second plurality of antennas, form a plurality of reception antenna beams to receive, from the BS, a Beam Reference Signal (BRS) formed in a predetermined synchronization subframe of a radio resource;
perform beamforming synchronization for the BS by receiving the BRS via the second plurality of antennas, wherein the BS sends the BRS by forming a plurality of transmission antenna beams for each symbol within the predetermined synchronization subframe of the radio resource;
select at least one transmission antenna beam among the plurality of transmission antenna beams;
identify a symbol location and a beam identifier for the selected at least one transmission antenna beam; and
transmit an uplink signal for random access to the BS using the identified symbol location and the identified beam identifier within the predetermined synchronization subframe of the radio resource.

2. The apparatus of claim 1, wherein the predetermined synchronization subframe of the radio resource corresponds to an uplink random access channel subframe being periodically allocated, and the BS forms a reception antenna beam for each symbol within the uplink random access channel subframe in the same manner as a transmission antenna beam pattern formed for each symbol when the beamforming synchronization is performed.

3. The apparatus of claim 1, wherein the processor is configured to select each transmission antenna beam for each symbol within the predetermined synchronization subframe of the radio resource during the beamforming synchronization for the BS.

4. The apparatus of claim 3, wherein the selected one transmission antenna beam is the transmission antenna beam having the best received signal quality from the plurality of transmission antenna beams formed in the each symbol within the predetermined synchronization subframe of the radio resource during the beamforming synchronization for the BS.

5. The apparatus of claim 1, wherein, in state of a non-contention-based random access, the processor is configured to transmit the uplink signal for random access to the BS using the identified beam identifier and the identified symbol location of a plurality of symbols within the predetermined synchronization subframe of the radio resource.

6. The apparatus of claim 3, wherein, in state of a contention-based random access, the processor is configured to transmit the uplink signal for random access to the BS based on each beam identifier matching to the each symbol location for the selected each transmission antenna beam within the predetermined synchronization subframe of the radio resource.

7. A method of transmitting, to a Base Station (BS) comprising a first plurality of antennas, an uplink signal for random access based on beamforming, the method performed by an uplink signal transmission device comprising a second plurality of antennas and a processor, the method comprising:
forming a plurality of reception antenna beams to receive, from the BS, a Beam Reference Signal (BRS) formed in a predetermined synchronization subframe of a radio resource;
performing beamforming synchronization for the BS by receiving the BRS via the second plurality of antennas, wherein the BS sends the BRS by forming a plurality of transmission antenna beams for each symbol within the predetermined synchronization subframe of the radio resource;
selecting at least one transmission antenna beam among the plurality of transmission antenna beams;
identifying a symbol location and a beam identifier for the selected at least one transmission antenna beam; and transmitting, based on the identified symbol location and beam identifier within the predetermined synchronization subframe of the radio resource, an uplink signal for random access to the BS.

8. The method of claim 7, wherein the predetermined synchronization subframe of the radio resource corresponds to an uplink random access channel subframe being periodically allocated, and the BS forms a reception antenna beam for each symbol within the uplink random access channel subframe in the same manner as a transmission antenna beam pattern formed for each symbol when the beamforming synchronization is performed.

9. The method of claim 7, wherein the selecting comprises selecting each transmission antenna beam for each symbol within the predetermined synchronization subframe of the radio resource.

10. The method of claim 7, wherein the transmitting comprises transmitting the uplink signal for random access to the BS using the identified beam identifier and the identified symbol location of a plurality of symbols within the predetermined synchronization subframe of the radio resource in a state of a non-contention-based random access.

11. The method of claim 9, wherein the transmitting comprises transmitting the uplink signal for random access to the BS based on each beam identifier matching to the each symbol location for the selected each transmission antenna beam within the predetermined synchronization subframe of the radio resource in a state of a contention-based random access.

* * * * *